United States Patent [19]

Roberts

[11] 4,156,257

[45] May 22, 1979

[54] MOTOR CONTROL CIRCUIT FOR TAPE DRIVE UNIT

[75] Inventor: Steven L. Roberts, Amherst, N.H.

[73] Assignee: MFE Corporation, Salem, N.H.

[21] Appl. No.: 783,961

[22] Filed: Apr. 4, 1977

Related U.S. Application Data

[63] Continuation-in-part of Ser. No. 643,323, Dec. 22, 1975, abandoned.

[51] Int. Cl.² ............... G11B 15/32; G11B 15/44; G11B 19/28
[52] U.S. Cl. .................. 360/71; 242/203; 318/7; 318/59; 318/317; 360/73; 360/74.3
[58] Field of Search ............... 360/71, 73–74; 242/186, 189, 190, 201–203; 318/6, 7, 59, 317

[56] References Cited

U.S. PATENT DOCUMENTS

| | | | |
|---|---|---|---|
| 3,764,087 | 10/1973 | Paananen et al. | 242/186 |
| 3,781,490 | 12/1973 | Phillips | 360/71 |
| 3,809,335 | 5/1974 | Mantey | 242/186 |
| 3,821,803 | 6/1974 | Sakamoto | 360/73 |
| 3,910,527 | 10/1975 | Buhler et al. | 242/186 |
| 3,913,137 | 10/1975 | Sargunar | 360/73 |
| 3,982,160 | 9/1976 | Goldschmidt et al. | 318/7 |
| 3,984,868 | 10/1976 | Ragle et al. | 360/73 |

OTHER PUBLICATIONS

MFE Corporation, Schematic 250 C-Drive, Drawing No. 00279000, 10/18/73.

*Primary Examiner*—Alfred H. Eddleman
*Attorney, Agent, or Firm*—Cesari and McKenna

[57] ABSTRACT

A tape drive for moving a tape with a prerecorded clock track past a transducer at a constant velocity. An output signal from a speed servo circuit controls the energization, and hence the speed, of a tape driving motor. It responds to a tape speed signal derived in part from a power supply voltage and a speed reference signal derived from the power supply voltage. Voltage variations and temperature-induced variations in the power supply have a minimal effect on tape velocity. Tension servo circuits control the power to a driven motor in response to the speed reference signal and the speed servo output signal thereby to maintain the tape under tension. A brake and park gating circuit slows the tape and maintains the tape under tension when it stops. The speed reference signal undergoes an exponential rise during starting operations to minimize acceleration.

15 Claims, 6 Drawing Figures

FIG. 4
READING CIRCUIT 76

MOTOR CONTROL CIRCUIT FOR TAPE DRIVE UNIT

CROSS-REFERENCE TO A RELATED APPLICATION

This application is a continuation-in-part of my copending U.S. Patent Application Ser. No. 643,323 filed Dec. 22, 1975 for a Motor Drive Control Circuit for Tape Drive Unit, which application is now abandoned.

BACKGROUND OF THE INVENTION

This invention generally relates to data processing system storage facilities and more specifically to a motor control circuit for tape drive units used in tape cassette magnetic storage facilities.

Magnetic tape cassette storage facilities for use in data processing systems have become very popular in recent years. This popularity stems from several factors. For example, the cassette is self-contained; thus, it is easier to handle the tape in a cassette than in a reel-to-reel tape storage facility. Tape cassettes and their drives are relatively simple and reliable. Moreover, the facilities are less expensive and more compact than reel-to-reel tape facilities.

Normally a tape cassette storage facility contains one or more drive units connected to a controller. The controller produces various control signals to start and stop the tape and otherwise to control data transfers to or from the tape. A conventional drive unit for use in such a facility includes motor driven spindles for moving the tape past openings in a cassette housing and past a transducer mounted on the drive. During a reading operation, the transducer transmits electrical signals in response to the magnetic patterns on the tape. During a writing operation, the transducer alters the magnetic patterns on the tape in response to the incoming electrical signals. Edge and corner blocks and other elements properly position the cassette housing with respect to the transducer. Various sensors monitor the presence of the tape cassette in the drive unit and the appearance of "end-of-tape" apertures in the tape for use by other circuits associated with the drive unit and controller.

It is important in these facilities that the tape in a drive unit pass the transducer at a constant speed. Some drive units attain constant tape speed by means of a constant speed drive, commonly a capstan, which engages the tape. In others, the tape contains a pre-recorded clock track. A control circuit receives clock pulses derived from the clock track and uses them to control motor, and thus tape, speed. In one such control circuit, the clock pulses modulate reference pulses from a constant frequency oscillator. In other such control circuits, to which this invention is primarily directed, the clock pulses are converted to an analog input signal for a direct-current drive-motor speed servo circuit.

In one such servo circuit for a tape cassette drive unit, the control circuit transmits direction signals in response to signals from the controller. These direction signals designate the direction of tape motion and thereby define one drive motor as a "driving" motor. The other drive motor is then a "driven" motor. The motors rotate in opposite directions when energized independently. They both connect to the output of a servo power supply controlled by the drive-motor speed servo circuit. Switching elements, which respond to the direction signals, connect one motor to ground as the driving motor. Thus, if the control circuit transmits a "forward" direction signal, the forward drive motor switching element closes to energize the forward motor as the driving motor with the output of the drive-motor speed servo circuit. The drive-motor speed servo circuit receives an analog signal dependent upon the repetition rate of pulses corresponding to each clock pulse and compares this analog signal with a dc reference signal derived from a diode junction.

It is also desirable to move the tape under tension. In the foregoing circuit, diodes from each junction formed by a motor and its corresponding switching element connect to a common junction controlled by a tension servo circuit that controls the power supplied to the drive thereby to maintain the tape under tension. The switching element which closes on the driving motor bypasses its corresponding diode but the other diode is coupled to a negative power supply through the tension servo circuit thereby to partially energize the driven motor. Thus, during normal operations, the torque generated in the driven motor opposes the motion produced by the driving motor and maintains tension on the tape.

The drive unit interprets the absence of both direction signals as a stop command. In the foregoing control circuit, a dynamic braking circuit responds to the stop command by disabling the switching element connected to the driving motor. Simultaneously, the braking circuit enables the fixed-width clock pulses derived from the clock track periodically to close the switching element connected to the driven motor, thereby to energize fully the driven motor on an intermittent basis. As a result, the tape slows so the periods between the energization of the driven motor lengthen. Thus, the average power to the driven motor decreases; and the tape slows and eventually stops.

Certain aspects of these servo control and other circuits have several deficiencies in commercial applications. For example, the reference voltage for the drive-motor servo circuit is derived from a diode junction. Although the reference voltage from a diode junction tends to be independent of power supply voltage variations, it is sensitive to variations in junction temperature. This temperature-caused instability detracts from the desirable constant speed characteristics. Moreover, variations in the diode junction voltages among individual diodes require a calibration circuit such as a potentiometer arrangement to provide a proper reference voltage. The introduction of a potentiometer arrangement complicates the circuit and increases its cost.

Other problems can occur during a start-up operation. When the control circuit transmits a direction signal, the drive-motor speed servo circuit receives the full reference voltage and transmits a maximum error signal. Thus, the servo circuit energizes the driving motor, which initially is at rest, at a maximum level; and the motor accelerates rapidly. It then is possible for the driving motor to accelerate to beyond the desired velocity; i.e., enter an "overspeed" condition. If this occurs, the normally positive common junction of the tension diodes can become negative causing the diode connected to the driving motor to bypass the corresponding switching element. During these conditions the drive motor servo circuit can become ineffective and both tension diodes can turn on. This is an unstable condition.

In use, the tape often is moved intermittently to read or write one or more records in succession. No reading or writing operations occur during the intervals that the tape accelerates to or decelerates from its normal operating speed. It is generally assumed that the tape accelerates to its proper operating speed within a fixed startup interval. However, friction characteristics of the tape cassette vary widely. These characteristics can largely determine the distance that the tape actually travels during the startup interval. If the actual acceleration varies from the assumed constant acceleration, then, obviously, the spaces between adjacent records on the tape differ. Thus, this characteristic reduces the average density of data on the tape including inter-record gaps.

High accelerations during start-up also can produce erratic tape motion. Consequently, the tape can slap or flutter against the transducer, thereby to damage the tape and cause various tape sensors positioned near the transducer to transmit improper signals.

When the stop command is received, the driving motor in the prior circuit is de-energized while the driven motor receives current pulses, as previously described. When a supply spool or reel on the driven motor has a relatively high inertia in comparison with the inertia of the take-up spool on the driving motor, the supply spool can continue to rotate even after the tape stops advancing past the transducer. Loose tape accumulates within the cassette under this condition. When the drive subsequently is energized, the driving and driven motors rotate in opposite directions until the tape snaps taut. This action can break the tape.

Moreover, this drive has an upper limit for reading data from the tape. The reading circuit contains a gain circuit and a peak detector comprising differentiator and threshold circuits. Output data signals from the peak detector are sampled periodically. In this drive, however, the sample timing is dependent upon the differentiator output signals which undergo wide voltage excursions and therefore delay sample timing. As a result, the sample is taken after an optimum time which corresponds to the instant the signal from the transducer should have a peak value. This reduces the maximum reading speed which can be attained. Moreover the threshold circuit is susceptible to electrical noise, so erroneous data signals can result.

Therefore, it is an object of this invention to provide an improved electrical control circuit for a magnetic tape cassette drive unit;

Another object of this invention is to provide a magnetic tape cassette drive unit control circuit which includes a more stable reference voltage for control purposes;

Another object of this invention is to provide a magnetic tape drive unit control circuit in which maximum reading speeds from the tape are improved;

Still yet another object of this invention is to provide a magnetic tape drive unit control circuit which is less susceptible to noise during reading operations.

SUMMARY OF THE INVENTION

In accordance with this invention, control signals from a controller designate driving and driven motors for a magnetic tape cassette drive unit thereby to control the direction of tape movement. A drive-motor speed servo circuit responds to incoming clocking pulses that depend upon the speed of the magnetic tape and a reference signal to control tape speed by varying the power supplied to the driving motor. A reference circuit derives the reference voltage from the power supply voltage. Thus, variations in the power supply voltage appear at both inputs to the drive-motor speed servo circuit and minimize the effect of these variations.

In accordance with another aspect of this invention, a reading circuit limits the output signals from a differentiator circuit responding to recorded data on the magnetic tape. This limitation minimizes time delays which would otherwise be necessary before a data signal is sampled and enables the data reading rate to increase.

This invention is pointed out with particularity in the appended claims. The above and further objects of this invention may be better understood by referring to the following detailed description taken in conjunction with the accompanying drawings.

DESCRIPTION OF AN ILLUSTRATIVE EMBODIMENT

Figure 1:
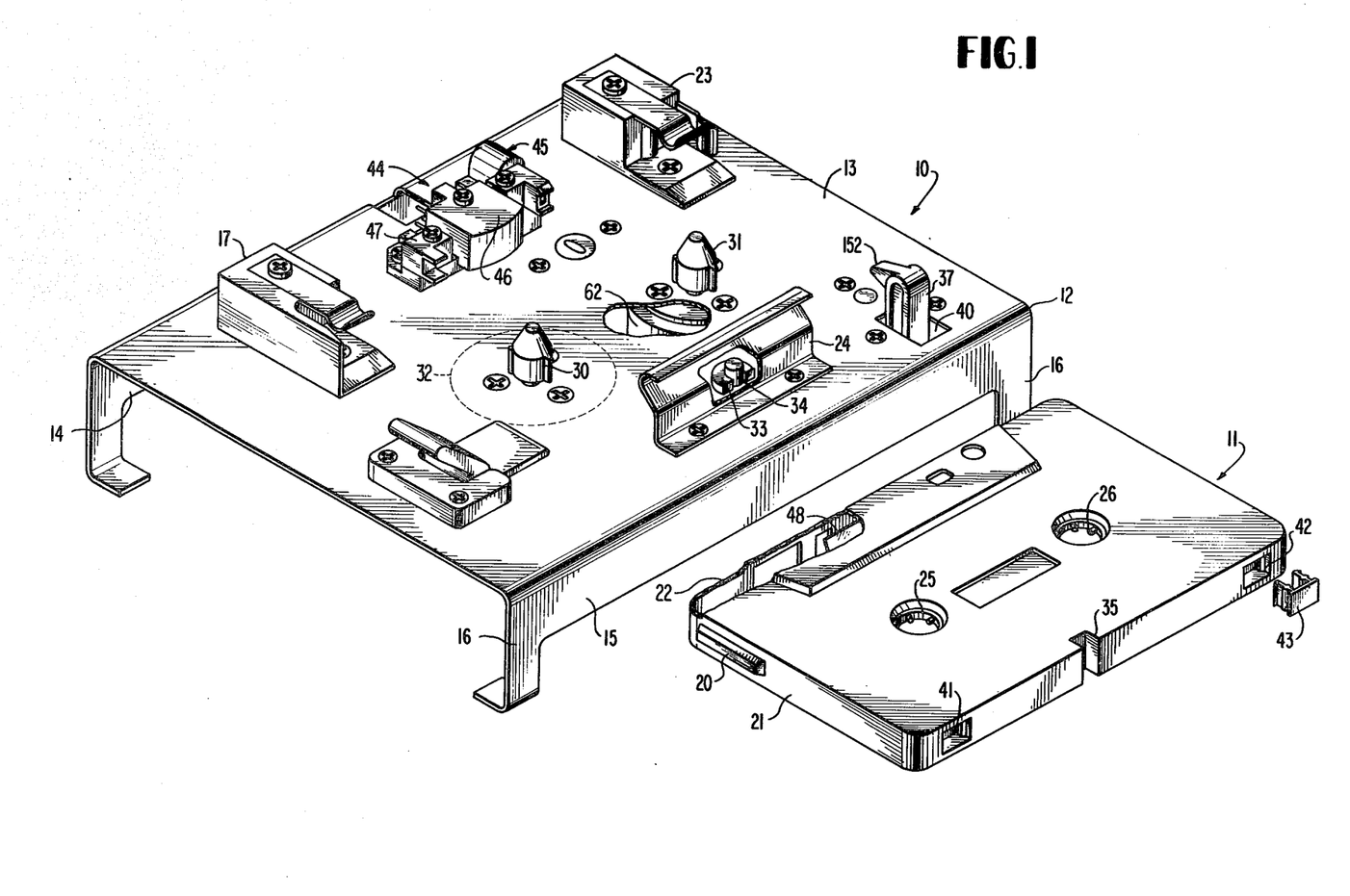
FIG. 1 is a perspective view, partially broken away, of a standard magnetic tape cassette and a drive unit adapted for using this invention when the tape contains a prerecorded clock track.

FIG. 1 depicts a tape drive unit, or tape transport, 10 and a conventional magnetic tape cassette 11. All the elements on the tape drive unit mount on an open frame 12 which includes a plate portion 13, front and back skirt portions 14 and 15 and depending legs 16. Other elements, not shown, such as the circuit board which controls the operation of and receives signals from various elements shown in FIG. 1, mount to the frame 12.

When the tape cassette 11 is inserted into the drive unit 10, a corner block 17 initially engages a ridge 20 on the cassette 11 formed along an edge portion 21 adjacent a leading edge 22. A similar ridge formed on the opposite edge portion engages an edge block 23. The corner and edge blocks 17 and 23 position the cassette 11 so it extends over a spring catch 24 disposed adjacent the skirt 15.

When the cassette 11 reaches a first position resting atop the spring catch 24, reel hubs 25 and 26 align with drive spindles 30 and 31 connected to drive motors, such as the drive motor 32 shown in association with spindle 30. The cassette is then forced down, displacing the spring catch 24, until it bottoms into an operating position defined by the edge and corner blocks 23 and 17 and the surface of a semi-circular platform 33. The platform 33 partially surrounds a switch actuator 34 which extends through the plate 13. In one operating position, the cassette 11 depresses the actuator 34; in the other, the actuator 34 is in register with a notch 35 in the trailing edge of the cassette 11.

When the cassette 11 is properly positioned, an actuator arm 37, which extends through an opening 40, aligns with one of two recesses 41 and 42 in the trailing edge. The actuator arm 37 senses whether the recess in register with it contains a plug 43. If the plug 43 is inserted, writing operations on the corresponding track of the tape are enabled.

A transducer subassembly 44 that also mounts to the plate portion 13 includes a detector 45, a reading-writing head 46 and a tape guide 47. The detector 45 senses the passage of an aperture adjacent either end of the tape or other apertures in the tape. Depending upon the orientation of the tape cassette 11, an aperture at the end of the tape may signal either the beginning or the end of the tape. In the following discussion, I merely refer to these apertures generally. The head 46 senses or alters the magnetic pattern on the tape 48 in the cassette 11.

Figure 2:
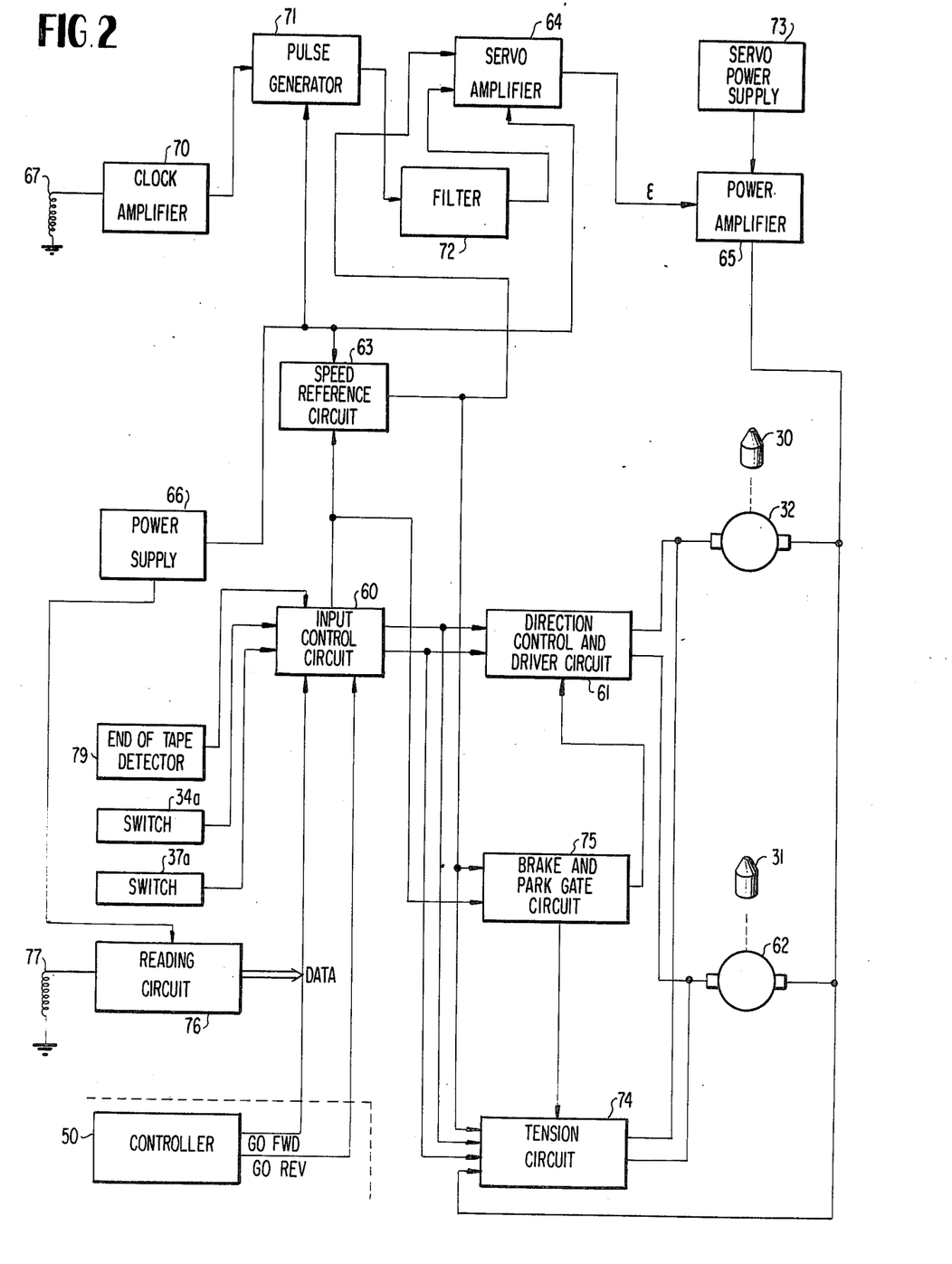
FIG. 2 is a block diagram of a control circuit embodying this invention for use with the magnetic tape cassette drive unit shown in FIG. 1.

Now referring to FIG. 2, a controller 50 generates GO FWD and GO REV direction control signals to an input control circuit 60 in the drive unit. Switch circuits 34A and 37a, which correspond to the switches associated with the actuators 34 and 37 in FIG. 1, respectively, and an end-of-tape detector 79 also provide input signals to the control circuit 60. In response to a GO FWD direction signal, the input control circuit 60 and a direction control and driver circuit 61 complete a circuit thereby to energize the motor 32, causing it to drive the reel on the hub 25 (FIG. 1) by rotating the spindle 30 and thus initiate tape movement in a forward tape direction. When the GO REV direction signal is generated, a motor 62 rotates the spindle 31 in the opposite direction, thereby driving the other hub 26 and initiating tape movement in a reverse direction.

A speed reference circuit 63 transmits a speed reference signal in response to the direction control signals from the input control circuit 60. The speed reference signal is one input to a drive motor speed servo circuit including a servo amplifier 64 and a power amplifier 65 which controls the energization of the motors. The circuit 63 derives the speed reference signal from a power supply 66 which also energizes the servo amplifier 64.

The servo amplifier 64 transmits an error signal "ε" is response to the difference between the speed reference signal and a tape speed signal which, in this embodiment, is derived from a pre-recorded clock track on the tape. A tape reading means including a reading transducer 67 senses these clocking pulses. A clock amplifier 70 triggers a pulse generator 71 in response to each clocking pulse on the tape thereby to produce a substantially constant energy pulse at the input to a filter 72. The filter 72 converts these pulses into a variable magnitude, dc signal. The magnitude of this dc signal depends solely on the repetition rate of the constant energy pulses, so it represents the speed of the tape past the reading head 67. This signal is the tape speed signal input to the servo amplifier 64.

The pulse generator 71 also is energized by the power supply 66 and the magnitude of the pulses therefore depends upon the power supply voltage. As any variation in the voltage from the power supply 66 appears at both control inputs to the servo amplifier 64, the error signal "ε" is substantially unaffected by the voltage variation.

The error signal ε from the servo amplifier 64 controls the power amplifier 65 thereby to establish the power supplied to the driven one of the motors 32 and 62. The foregoing circuitry constitutes a closed-loop servo which minimizes the error signal ε and thereby maintains a constant linear tape speed past the head 46 in FIG. 1.

A tension circuit 74 also receives the speed reference signal from the circuit 63 and signals from the input control circuit 60 thereby to control the power supplied to the driven one of the motors 32 and 62. This maintains the tape under the proper tension, as it moves past the head 46 in FIG. 1.

A brake and park gate circuit 75 operates when no direction signals are present. Basically this circuit stops the tape and maintains the tape at rest and under tension.

A reading circuit 76 also is energized by the power supply 66. The reading circuit 76 converts pulses from a data reading head 77 into DATA signals in digital form for use by other circuits. These other circuits are not shown and form no part of this invention.

Figure 3:
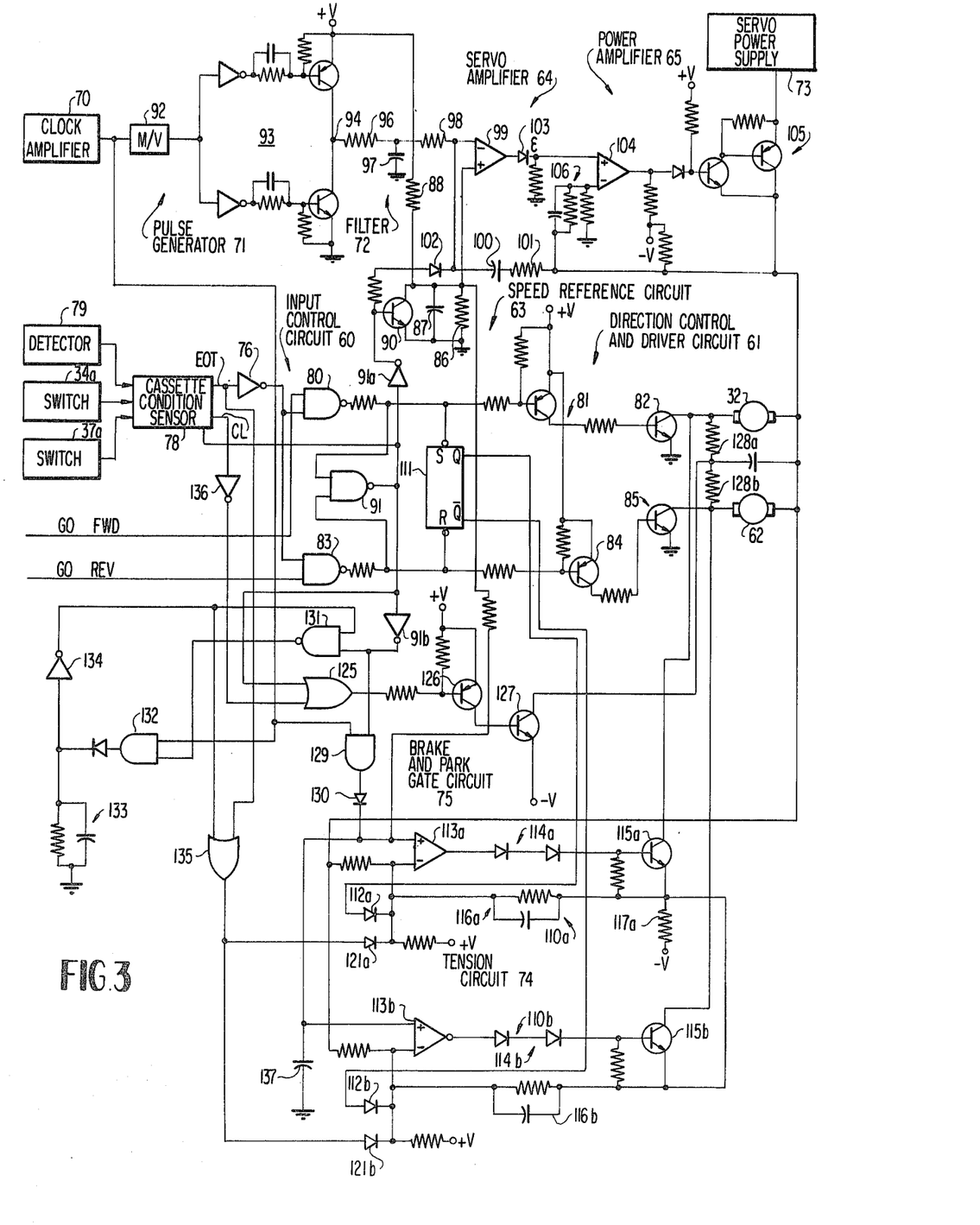
FIG. 3 is a detailed schematic of a portion of the circuitry shown in FIG. 2.

Now referring to FIG. 3, the detector 79 transmits a signal whenever the tape stops moving. A cassette condition sensor 78 responds to signals from the detector 79 and the switches 34a and 37a and asserts a CL signal whenever the cassette is positioned properly in the drive unit. It also transmits an EOT signal in response to the signal from the detector 79. Normally, however, the EOT signal is inactive, so an inverter 76 enables a NAND gate 80. If the GO FWD signal is also active, the NAND gate 80 turns on a transistor amplifier 81 thereby turning on a switching transistor 82 and establishing a connection from the servo power supply 73 through the power amplifier 65 and the motor 32, as the driving motor, to ground. The GO REV signal is inactive so a NAND gate 83, which the inverter 76 also enables, keeps a transistor amplifier 84 and a switching transistor 85 from conducting and thereby blocks the path from the servo power supply 73 through the motor 62 to ground.

Conversely, if the controller transmits a GO REV signal, the NAND gate 83 turns on the transistor amplifier 84 and switching transistor 85, while the transistor amplifier 81 and switching transistor 82 do not conduct. Hence, the motor 62 is then the driving motor and the motor 32 is the driven motor.

Thus, the switching transistors 82 and 85 act as normally non-conducting, monostable switches in circuit with the first and second motors 32 and 62, respectively. The NAND gate 80 and transistor amplifier 81, on the one hand, and the NAND gate 83 and transistor amplifier 84, on the other hand, respond to the GO FWD and GO REV direction signals respectively for shifting the corresponding ones of these monostable switches to their astable, or conducting, states.

As will now be apparent, the servo amplifier 64 and power amplifier 65 control the power which the power supply 73 supplies to the driving one of the motors 32 and 62. As shown in FIG. 3, the speed reference circuit 63, which provides the speed reference signal to the servo amplifier 64, comprises a capacitive charging circuit including a resistor 86 and parallel capacitor 87 coupled to a power supply terminal (+V) through a resistor 88. A charge control element that enables the capacitor 87 to charge includes a transistor 90 which responds the output signal from a NAND gate 91. More specifically, if the controller transmits either the GO FWD or GO REV direction signal, one of the NAND gates 80 and 83 disables the NAND gate 91 and, through an inverter 91a turns off the transistor 90 so the capacitor 87 charges. On the other hand, when neither the GO FWD nor the GO REV direction signal is active, the NAND gates 80 and 83 energize the NAND gate 91. This turns on transistor 90 and shunts the capacitor 87 so it can not charge.

Still referring to FIG. 3, each successive pulse from the clock amplifier 70 triggers a monostable multivibrator 92 which generates a fixed-width pulse. These pulses drive a push-pull amplifier 93. The output signal at junction 94 of the amplifier 93 is either at ground or at the potential of the power supply (+V) and constitutes a series of substantially constant energy, variable frequency pulses. The filter 72, which comprises a resistor 96 and capacitor 97, converts these pulses to a variable DC signal, i.e., the tape speed signal, whose voltage depends on the repetitive rate of the clock pulses. A resistor 98 couples this signal to the inverting input terminal of an operational amplifier 99 in the servo amplifier 64.

A capacitor 100 and resistor 101 constitute a servo compensation circuit in a feedback loop for the servo amplifier 64 so that the drive servo operates with gain and rate functions. The NAND gate 91 normally back biases a diode 102 poled to conduct from the NAND gate 91 to the inverting input of the amplifier 99. This isolates the NAND gate 91 from the input to the amplifier 99 during normal operations.

A diode 103 couples the output signal from the amplifier 99 to the non-inverting input of an operational amplifier 104 which drives an amplifier 105 comprising a pair of transistors in a Darlington connection. The amplifier 105 couples the servo power supply 73 to the motors 32 and 62. An input network 106 provides negative feedback path for amplifier 105.

Normally the servo power supply 73 and power amplifier 65 energize a corresponding terminal of both the motors 32 and 62. The other terminal of the driving motor is grounded by the corresponding monostable switch (i.e., switching transistor 82 or 85) while the tension circuit 74 controls the power supplied to the driven motor so as to maintain the tape under constant tension. The power supplied to the driven motor is less than the power supplied to the driving motor. Thus, the driving motor overdrives the driven motor and advances the tape. However, the torque in the driven motor opposes the direction of rotation of the driving motor and, therefore, maintains the tape under tension. As shown in FIG. 3, the tension circuit 74 comprises a tension servo circuit 110a connected in circuit with the motor 32 and a tension servo circuit 110b connected in circuit with the motor 62.

Assuming that the controller generates a GO FWD signal, the output from the NAND gate 80 is at a ground potential while the output from the NAND gate 83 is at a positive potential. This sets a latch 111 and thereby forward biases a diode 112a to disable the tension servo circuit 110a and back biases a diode 112b in the tension servo circuit 110b. More specifically, when the latch 111 back biases the diode 112b, an operational amplifier 113b produces an output signal determined by the input signals from the power amplifier 65 and the speed reference circuit 63. Diodes 114b provide a level shift which enables the amplifier 113b to drive the collector electrode of a transistor 115b to a negative potential (−V). The tension servo circuit 110b additionally comprises a negative feedback network 116b. Thus, the transistor 115b, in conjunction with the power amplifier 65, controls the power supplied to the motor 62 when it is the driven motor. If, during normal operations, the voltage supplied from the power amplifier 65 increases, and thereby increases the power to the driving motor 32, the transistor 115b becomes less conductive and reduces the power to the driven motor, thereby to offset any increase in the tension of the tape.

When the controller generates a GO REV signal, the latch 111 resets thereby to disable the tension servo cricuit 110b and enable the tension servo circuit 110a. As both circuits operate in the same manner, the same reference numerals designate like components, except that the suffix is "a" to refer to the tension circuit 110a.

Thus, during normal operations, the tension servo circuits 110a and 110b each have a first input connected to the speed reference circuit 63 and a second input connected to the servo power amplifier 65. The circuit corresponding to the driving motor is disabled. An output amplifier connects to a junction formed by the corresponding motor and monostable switch to control the power supplied to the driven motor and, hence, the tension of the tape. Moreover, the latch 111 is a bistable device which responds to the first and second direction signals for activating one of these tension servo circuits.

During the foregoing operation, the brake and park gate circuit 75 is inactivated. More specifically, the NAND gate 91 energizes an OR gate 125 thereby biasing an amplifier 126 and a transistor amplifier 127 so there is no current conducated through resistors 128a and 128b that connect to the motors 32 and 62, respectively. An inverter 91b connected to the output of the NAND gate 91 disables an AND gate 129. This back biases a diode 130, so the speed reference circuit 63 is the source of the input signal to the non-inverting inputs of the amplifiers 113a and 113b. Moreover, the inverter 91b conditions a NAND gate 131 so it enables an AND gate 132 to pass clocking pulses from the clock amplifier 70 into a charging circuit 133. During these normal operations, the voltage across the charging circuit 133 forces the output signal from an inverter 134 to be substantially at a ground level. As neither the EOT signal from the cassette condition sensor 78 nor the output signal from the inverter 134 energizes an OR gate 135, the diodes 121a and 121b also are back biased to enable the tension circuit 74.

There are two ways in which the motors 32 and 62 can stop. The asserted one of the GO FWD or GO REV signals can terminate. As previously indicated, this condition is interpreted as a stop command, and the NAND gate 91 de-energizes the OR gate 125. With the cassette in position, the CL signal from the cassette condition sensor 78 also forces the output signal from an inverter 136 to a non-assertive state so the OR gate 125 is de-energized. Hence, the transistor amplifiers 126 and 127 shift to a conductive state and current is conducted through both the motors 32 and 62 and respective ones of the resistors 128a and 128b. Simultaneously, the inverter 91b enables the AND gate 129 to couple clock pulses from the clock amplifier 70 through the diode 130 to the corresponding one of the tension servo circuits 110a or 110b and an averaging capacitor 137. Only the operable one of the tension servo circuits 110a or 110b also energizes the driven motor. As a result, the tape slows.

The torque on the driven motor tends to minimize the accumulation of loose tape within the cassette, especially if the driven reel high inertia.

Moreover, as the tape slows, the duty cycle of the clock pulses from the clock amplifier 70 decreases. Thus, the voltage across the capacitor 137 decreases to reduce the torque controlled by the tension circuit 74. Also the voltage from the charging circuit 133 decreases. At some point, the voltage from the circuit 133 forces the output signal from the inverter 134 to a positive level. This disables the NAND gate 131 so no further clock pulses can be applied to the charging circuit 133, and the charging circuit 133 voltage discharges to zero. Simultaneously, the inverter 134 energizes the OR gate 135 thereby to disable the tension circuits 74. Then the circuit including the amplifier 127 is the only conductive circuit through the motors 32 and 62. In this state, the brake and park gate circuit 75 maintains some reduced torque on the driving and driven motors and further minimizes the accumulation of loose tape within the cassette. Within the tolerances permitted by the friction in the cassette, the circuit 75 thereby maintains the tape stationary and under tension. Tape flutter and slapping, which would otherwise occur during any subsequent start-up, thereby are minimized.

The tape stops when it is unwound completely from the reel on the driven motor or if some particular malfunction occurs. Whenever such a tape stop page occurs, the cassette condition sensor 78 asserts the EOT signal. This disables both the NAND gates 80 and 83 and simulates a stop command. Moreover, the EOT signal also energizes the OR gate 135 and disables the tension circuit 74 to eliminate any tension on the tape.

If the tape stop as the result of the cassette condition sensor 78 transmitting the EOT signal, that signal must be reset or cleared before the tape drive can be activated again. No matter what the cause for tape stoppage, a direction control signal must be transmitted from the controller 50 shown in FIG. 2 before the circuit in FIG. 3 can advance the tape. The circuit in FIG. 3 also is essentially insensitive to any transient clock signals because both the clock pulse controlling AND gates 129 and 132 are disabled.

When the controller transmits either a GO FWD or GO REV signal, the NAND gate 91 again energizes the OR gate 125 and thereby terminates the current through the resistors 128a and 128b. Simultaneously, the AND gate 129 is disabled while the AND gate 132 is enabled. Initially, however, the voltage from the circuit 133 is below an input threshold for the inverter 134 so the tension circuit 74 remains disabled during the initial tape acceleration. After a short interval, however, a signal from the charging circuit 133 rises above the threshold so the inverter 134 and the OR gate 135 enable the tension circuit 74 to operate.

It will also be apparent, that the motors should be disabled whenever a cassette is removed from the tape drive. Whenever the cassette is removed, the cassette condition sensor 78 transmits the EOT and CL signals. The inverted EOT signal also energizes the OR gate 135 to disable the tension circuit 74 while the inverter 136 energizes the OR gate 125 thereby to condition the amplifier 127 to a non-conducting state.

Still referring to FIG. 3, it also will be apparent that the resistors 128a and 128b are not components in the tension circuit 74. Thus, problems introduced when similarly situated diodes in prior systems are conductive can not occur as the brake and park gate circuit 75 is disabled whenever the controller issues either to GO FWD or GO REV signal.

In the prior drives the speed reference signal shifts to its full value in a step function. The problems this stepwise rise introduces are minimized in accordance with another aspect of this invention. More specifically, when the NAND gate 91 is energized, the speed reference circuit 63 is off. However, when the controller issues either a GO FWD or GO REV signal, the transistor 90 turns off and the capacitor 87 begins to charge. Thus, the speed reference signal rises exponentially according to the values of the resistors 86 and 88 and the capacitor 87. This exponential rise provides better control of the rise of the error signal from the servo amplifier 64 and of the acceleration which the driven one of the motors 32 and 62 undergoes. As a result, the problems which occur in an overspeed condition due to rapid acceleration are minimized. Moreover, acceleration is less dependent upon the friction encountered in different cassettes so there is more uniform spacing between records on the tapes in difference cassettes. Any tendency toward erratic tape motion during start-up, such as tape flutter and slap also is minimized.

Figure 4:
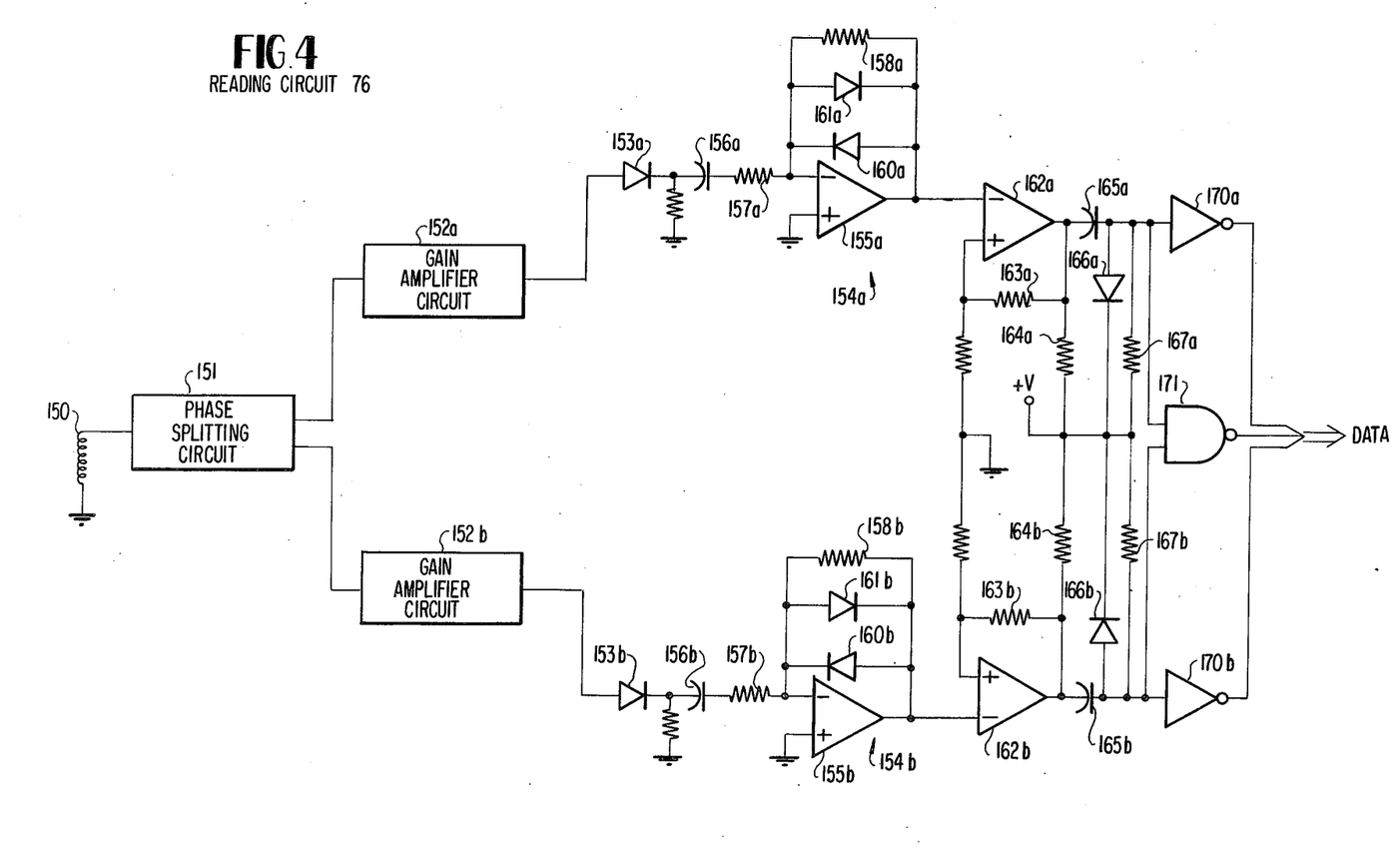
FIG. 4 is a detailed schematic of the reading circuit shown in FIG. 2.

The tape in the cassette 11 has, in addition to the prerecorded clock track, which the transducer 67 monitors, a data track. As shown in FIG. 4, a transducer 150 produces an electrical signal which a phase splitting circuit 151 converts into two signals which are 180° out of phase with each other. Gain amplifier circuits 152a and 152b drive separate legs of the reading circuit 76 shown in FIG. 4 in response to these signals. As both legs are identical, only the leg connected to the gain amplifier circuit 152a is discussed in detail.

More specifically, a diode 153a couples the output signals from the gain amplifier circuit 152a to a differentiator circuit 154a including an amplifier 155a and an input capacitor 156a and resistor 157a. A resistor 158a provides negative feedback for the differentiating circuit 154a. In accordance with another aspect of this invention, there are connected in parallel with the feedback resistor 158a, oppositely poled diodes 160a and 161a. These diodes limit the output voltage from the amplifier 155a and minimize the saturation of the reading circuit. This reduces circuit response times so the interval between the peak signal time and a sample time can be reduced significantly. In fact, it has been found that the reading circuit 76 shown in FIG. 4 can provide reading rates in the order of 32 kilobits per second.

Threshold circuits connected in each leg further enhance the response of the reading circuit 76. An amplifier 162a, with a positive feedback resistor 163a and a biasing resistor 164a connected to the positive power supply (+V), receives the output from the differentiating circuit 154a. A capacitor 165a, a diode 166a and a resistor 167a couple resulting signal from the threshold circuit to an inverter 170a. A NAND gate 171 receives signals from the inverters 170a and an inverter 170b in the other leg to provide, with the inverters 170a and 170b, parallel DATA output signals.

Referring more specifically to the threshold circuits, the output from the amplifier 162a latches at one of two threshold values. Although the output will latch to a positive potential at one threshold level, it returns to a negative potential at a higher threshold level so that there is "hysteresis" in the circuit. This hysteresis characteristic minimizes the circuit's susceptibility to noise and further enhances the operation of the reading circuit.

The magnetic cassette drive unit shown in FIG. 1 and the circuitry shown in FIGS. 2 and 3 are used with a tape cassette in which the tape contains a prerecorded clock track. However, it also is possible to apply this invention to a tape cassette in which the tape contains two data tracks and no prerecorded clock track. Such a tape drive unit can be constructed merely by adding two elements to the tape drive unit shown in FIG. 1 and by modifying the circuitry shown in FIG. 3 slightly.

Figure 5:
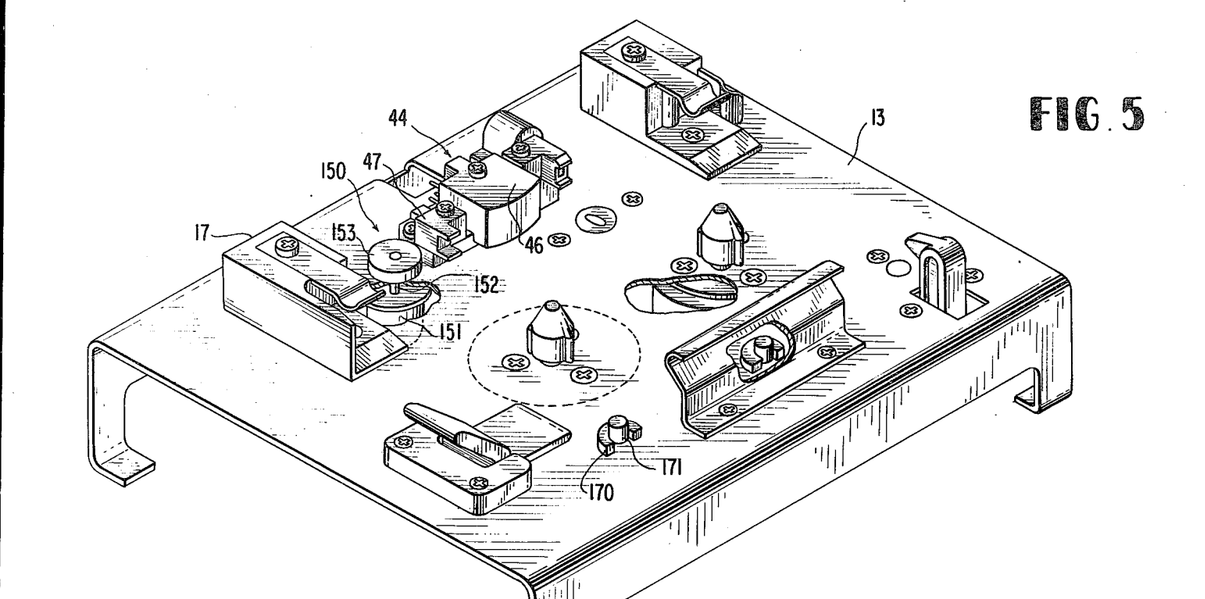
FIG. 5 is a perspective view, partially broken away, of the unit in FIG. 1 modified to accept a tape without a prerecorded clock track.

In FIG. 5, a tachometer generator 150 mounts to the plate portion 13 between the corner block 17 and the transducer subassembly 44 including the detector 45, reading-writing head 46 and tape guide 47. The tachometer generator 150 includes a housing 151 located below the plate portion 13. This housing 151 contains the circuitry for generating clocking signals. This circuitry is constituted by a conventional incremental encoder assembly that produces a seris of pulses usng well-known photoelectric circuitry. The circuitry produces electrical signals which are dependent upon the angular velocity of a shaft 152 that extends through the plate portion 13. As the tape passes the transducer assembly 44, it engages a tachometer wheel 153 that is mounted to the shaft 152 and that extends radially to pass through one of the front apertures of the tape cassette. Thus, the tachometer wheel 153 is driven by the tape during motion of the tape, and the tachometer generator 150 produces output signals that are utilized by the circuitry shown in FIG. 6 for controlling tape speed.

Figure 6:
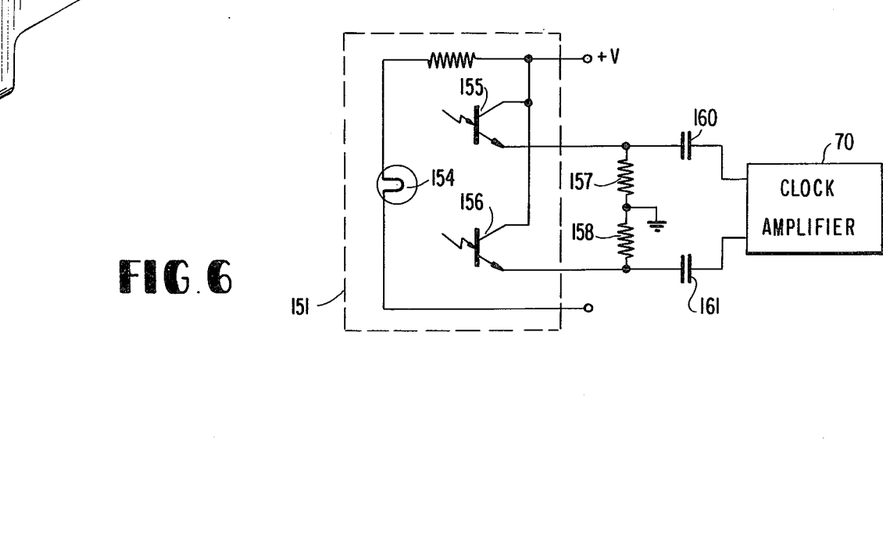
FIG. 6 is a schematic diagram that illustrates the changes made to the circuitry in FIG. 3 when the embodiment of FIG. 5 is used.

Referring now to FIG. 6, the circuitry bounded by the dashed line 151 represents the circuitry of the incremental encoder 151 in FIG. 5. This circuitry comprises a lamp 154 as energized by a power supply (+V) and two phototransistors 155 and 156. During operation of the encoder, light is enabled to strike the phototransistors 155 and 156 thereby to develop an AC voltage across grounded resistors 157 and 158, respectively. Capacitors 160 and 161 a-c couple the output signal developed across the resistors 157 and 158 to the clock amplifier 70. Whereas in the circuitry shown in FIG. 2 the inductor 67 constitutes a single input to one input of an operational amplifier in the clock amplifier 70, the capacitors 160 and 161 are coupled to the inverting and non-inverting inputs of the operational amplifier. Thus, the output signals from the clock amplifiers 70 in FIGS. 2 and 5 are the same.

There is also shown in FIG. 5, a switch 170 that has the same construction as the switch 34 in FIG. 1. When the circuitry in FIG. 1 is modified to take a two-track tape cassette without a prerecorded clock track, the switch 34 shown in FIG. 1 is disconnected. The output of the switch 34A no longer constitutes an input signal to the input control circuit 16 in FIG. 2. However, the switch circuit 34 shown in FIG. 1 can produce a signal that indicates whether the cassette has been inserted with track A or track B in position to be read by the transducer assembly 46. The switch 170 is positioned so that in either orientation of the tape cassette 11 shown in FIG. 1, a plunger 171 is depressed when the tape cassette is properly loaded. This switch 170 therefore replaces the switch 34 in FIG. 1. A corresponding change is made in the schematic of FIG. 2 by replacing the switch circuit 34A with a corrresponding switch including the switch 170. Thus, with the unit shown in FIGS. 5 and 6, the tachometer generator 150 produces signals which are fed to the clock amplifier 70, shown in FIG. 6 thereby to produce an otherwise analogous operation to the circuitry shown in FIG. 2.

Thus, in accordance with this invention, the circuitry shown in FIG. 2 and in detail in FIGS. 3, 4 and 6 constitutes improved control circuits for a magnetic tape cassette drive unit. Although FIG. 2 shows separate power supplies 66 and 73, it will be apparent that these can be and normally will be constituted by a single power supply circuit that is located remotely with respect to the remainder of the circuitry in FIG. 3. Moreover, FIGS. 3, 4 and 6 depict specific circuits for implementing this invention. It will be apparent, however, that these circuits can be modified and that the modified circuits will have some or all of the advantages of the specifically disclosed circuitry. Therefore, it is an object of the appended claims to cover all such variations and modifications as come within the true spirit and scope of this invention.

What I claim as new and desire to secure by Letters Patent of the United States is:

1. A tape drive unit energized by a power supply for operation in response to a direction control signal that is generated by a tape drive controller means to initiate movement of magnetic tape in a first direction, the magnetic tape being stored on first and second reels, said drive unit comprising:
    A. first and second motor means for driving said first and second reels, respectively,
    B. reference means responsive to the direction control signal and connected to the power supply for transmitting a speed reference signal that is dependent upon the power supply voltage,
    C. means connected to the power supply and responsive to movement of the magnetic tape for transmitting a tape speed signal that is, in part, dependent upon the power supply voltage,
    D. servo means connected to both said motor means, said servo means being responsive to the speed reference signal and the tape speed signal, and
    E. selection means for completing a circuit including the power supply, said servo means and one of said motor means in response to the direction control signal thereby to enable said servo means to control tape speed.

2. A tape drive unit as recited in claim 1 wherein said reference means includes:
    i. a capacitive charging circuit energized by the power supply for transmitting the speed reference signal, and
    ii. charge control means for enabling the power supply to charge said capacitive charging circuit in response to the direction control signal.

3. A tape drive unit as recited in claim 2 wherein said servo means includes
    i. power amplifier means with an output in circuit between the power supply and said motor means,
    ii. servo amplifier means with inputs for the speed reference signal and the tape speed signal for energizing said power amplifier means,
    iii. feedback means for said servo amplifier means, and
    iv. means connected to said feedback means and to said charge control means for applying an offsetting input signal to said servo means in the absence of the direction control signal.

4. A tape drive unit as recited in claim 1 wherein said tape drive controller means generates first and second direction control signals to initiate tape movement in first and second directions, respectively, and wherein said selection means includes:
    i. first and second monostable switch means in circuit with said first and second motor means, respectively, and
    ii. means responsive to the first and second direction control signals for closing said first and second monostable switch means, respectively.

5. A tape drive unit as recited in claim 4 additionally comprising:

G. first and second tension servo circuits, each of said tension servo circuits having a first input connected to said reference means, a second input connected to said servo means and an output means connected to a junction formed by said corresponding motor means and said monostable switch means, and H. bistable means responsive to the first and second direction control signals for activating one of said tension servo circuits whereby the selection of one of said motor means as a driving motor means by said selection means shifts said monostable switch means to said one motor means into an astable, conducting state and enables said tension servo circuit connected to the other, driven, motor means to control the energy therethrough and tape tension.

6. A tape drive unit as recited in claim 5 wherein said tape reading means includes means for transmitting successive clock pulses in response to the passage of the pre-recorded clock track, said tape drive unit additionally comprising:

I. means for coupling therethrough pulses from said tape reading means when both said direction control signals are inactive, and J. means for conveying the pulses from said coupling means to said first inputs of each of said tension servo circuits, said bistable means enabling and disabling, respectively, said tension servo circuits in circuit with said driven and driving motor means, respectively.

7. A tape drive unit as recited in claim 6 wherein said pulse conveying means includes means for averaging the clock pulses.

8. A tape drive unit as recited in claim 6 additionally comprising a parking circuit for maintaining tension on the tape when the tape is at rest, said parking circuit comprising i. first and second conducting means connected to a junction formed by the said corresponding motor means and monostable switch means, and ii. means responsive to the absence of the first and second direction signals and the absence of tape motion for enabling both said conducting means to conduct whereby both of said motor means are energized equally thereby to maintain the tape at rest under tension.

9. A tape drive unit as recited in claim 1 wherein the tape has a second track for storing information, said tape drive unit additionally including a reading circuit connected to the power supply for generating data signals at an output thereof which depend on the information stored on the second track, said reading circuit comprising:

i. a transducer for transmitting a signal representing information on the second track, ii. means for converting the signal from said transducer into first and second spaced phase signals, iii. first and second differentiator means including means to limit the amplitude of the output signal therefrom for differentiating the first and second spaced phase signals, respectively, and iv. first and second threshold circuit coupling the outputs of said first and second differentiator means, respectively, to the reading circuit output as data signals.

10. A tape drive unit responsive to first and second direction control signals from a tape drive controller means to initiate the movement of magnetic tape, said tape drive comprising:

A. transducer means disposed adjacent the tape,

B. first and second motor means for driving the tape past said transducer means, the first and second direction control signals designating said first and second motor means, respectively, as driving motor means, C. means for generating a tape speed signal corresponding to the tape speed past said transducer means, D. reference means for generating a speed reference signal corresponding to the desired tape speed, E. servo means for controlling the speed of the driving one of said motor means in response to the tape speed signal and the speed reference signal, F. first and second tension servo circuits, each of said tension servo circuits having a first input connected to said reference means and a second input connected to said servo means, and G. bistable means responsive to the first and second direction signals for activating one of said tension servo circuits whereby the selection of one of said motor means as the driving motor means causes said tension servo circuit to be connected to the other of said motor means as a driven motor means to control the power thereto.

11. A tape drive unit as recited in claim 10 wherein said transducer means includes means for transmitting pulses in response to the passage of the tape, said tape drive unit additionally comprising means for coupling the pulses to said first inputs of each of said tension servo circuits, said bistable means enabling and disabling, respectively, said tension servo circuits in circuit with the corresponding ones of said driven and driving motor means.

12. A tape drive unit as recited in claim 11 when said pulse coupling means includes means for averaging the pulses.

13. A tape drive unit for magnetic tape, said tape drive unit comprising:

A. transducer means for reading information recorded on the tape,

B. means for transporting the tape past said transducer means whereby said transducer means generates signals representing the recorded information on the tape, C. means for converting the signal from said transducer into first and second spaced phase signals, D. first and second differentiating means including means to limit the amplitude of the output signal therefrom for differentiating the first and second spaced phase signals, respectively, and E. first and second threshold circuits for transmitting data signals in response to the signals from said first and second differentiator means, respectively.

14. A tape drive unit as recited in claim 13 wherein each of said differentiating means includes:

i. differential amplifier means including a resistive feedback path, and ii. oppositely poled diodes in parallel with said feedback path whereby said diodes limit the output of said differentiating means.

15. A tape drive unit as recited in claim 13 wherein each of said first and second threshold circuits includes:

i. first and second amplifier means with positive feedback circuits to first inputs thereof, said second inputs thereof being connected to said first and second differentiating means, respectively, and ii. first and second resistors for coupling the first inputs of each of said amplifier means to a reference voltage whereby the threshold circuits operate with a hysteresis characteristic.

* * * * *